(12) United States Patent
Andrieu et al.

(10) Patent No.: US 6,980,719 B2
(45) Date of Patent: Dec. 27, 2005

(54) OPTICAL DEVICE OF VARIABLE REFRACTIVE INDEX

(75) Inventors: Xavier Andrieu, Bretigny sur Orge (FR); Alain Pastouret, Les Ulis (FR); Joël Jacquet, Limours (FR); Sylvic Barusseau, Le Plessis Pate (FR)

(73) Assignee: Alcatel, Paris (FR)

( * ) Notice: Subject to any disclaimer, the term of this patent is extended or adjusted under 35 U.S.C. 154(b) by 167 days.

(21) Appl. No.: 10/740,760

(22) Filed: Dec. 22, 2003

(65) Prior Publication Data
US 2004/0131314 A1 Jul. 8, 2004

(30) Foreign Application Priority Data
Jan. 3, 2003 (FR) .................................. 03 00028

(51) Int. Cl.[7] ........................... G02B 6/10; G02B 6/16; G02B 6/26; G02F 1/19
(52) U.S. Cl. ................... 385/40; 385/123; 385/129; 385/142; 385/143; 385/144; 385/37
(58) Field of Search ............................. 385/40–42, 37, 385/123–128, 129–132, 141–145

(56) References Cited

U.S. PATENT DOCUMENTS

| | | | |
|---|---|---|---|
| 4,343,537 A | | 8/1982 | Guntherodt et al. |
| 5,311,350 A | * | 5/1994 | Hiramatsu et al. .......... 359/263 |
| 5,724,177 A | * | 3/1998 | Ellis et al. ................... 359/273 |
| 6,625,378 B2 | * | 9/2003 | O'Brien et al. ............. 385/140 |
| 6,914,802 B2 | * | 7/2005 | Kozicki ....................... 365/153 |
| 2001/0019800 A1 | | 9/2001 | Herreyere et al. |

FOREIGN PATENT DOCUMENTS

| | | |
|---|---|---|
| CH | 627 860 A5 | 1/1982 |
| EP | 0 496 278 A2 | 7/1992 |
| EP | 1 081 538 A | 3/2001 |
| EP | 1 298 469 A2 | 4/2003 |

* cited by examiner

*Primary Examiner*—Rodney Bovernick
*Assistant Examiner*—Omar Rojas
(74) *Attorney, Agent, or Firm*—Sughrue Mion, PLLC

(57) ABSTRACT

The present invention relates to an optical device comprising an ionic conductor and a pair of electrodes, the ionic conductor being made of a material that is transparent to light and contains mobile ions and the electrodes being suitable for absorbing and desorbing the ions and being in ionic contact with the ionic conductor. The refractive index in at least a zone of the ionic conductor can be varied under the effect of the voltage applied between the electrodes. The electrodes contain an electrochemically active material selected from an active carbon, a conductive polymer, and an insertion material suitable for inserting ions in its structure.

30 Claims, 3 Drawing Sheets

OPTICAL DEVICE OF VARIABLE REFRACTIVE INDEX

FIELD OF THE INVENTION

The present invention relates to an optical device for transmitting light through a medium of refractive index that can be modified depending on user requirements. The invention also relates to apparatus using the optical device. The invention also extends to a method enabling the refractive index of such a device to be varied.

BACKGROUND OF THE INVENTION

An optical device for transmitting light, also known as a waveguide, comprises a light-guiding portion or "core" and a cladding portion for confining light in the core. The device may comprise a waveguide having a core that is circular (optical fibers) or rectangular, and surrounded in cladding of lower refractive index. The device may also be a plane waveguide, likewise comprising a guiding layer and cladding, and deposited on a substrate acting as a support. Waveguides based on silica glasses have been in existence for a long time. Waveguides based on organic polymers constitute a more recent development.

The ability to modify the refractive index of a waveguide finds numerous applications in optical components. Thus, wavelength-selective filters are essential components for communications systems. Filters enable spectral separation to be performed by reflecting at certain wavelengths and transmitting at others. The filter function is performed in particular by diffraction gratings known as "Bragg" gratings. A Bragg grating is a wavelength-selective reflector having a periodic structure that establishes index modulation. It is characterized by its passband, i.e. the range of wavelengths that it allows to pass. A given array generally presents a reflection maximum at a certain wavelength $\lambda_b$ referred to as the "Bragg wavelength". It is defined by the relationship: $\lambda_b = 2 \cdot n_{\mathit{eff}} \cdot \Lambda$ where $\Lambda$ is the pitch of the Bragg grating and where $n_{\mathit{eff}}$ is the mean effective refractive index of the guided fundamental mode incident on the grating. When the index can be modified, the Bragg wavelength $\lambda_b$ can also be modified, so the filter becomes tunable. Bragg gratings can be made by optical, mechanical, or chemical methods that lead to a physical modification of the support. It has recently become possible to transform a small portion of a waveguide into a filter by inducing periodic variation in the refractive index of the core in the form of lines that are regularly spaced apart at a fixed distance;

In general, changing the mean effective refractive index $n_{\mathit{eff}}$ of a simple waveguide enables an optical wavelength in a system to be adjusted. By way of example, this can be used to achieve fine adjustment of the characteristic frequencies of the system. Tunable lasers, tunable filters, and modulators are other examples of components that make use of such variable-index waveguides.

By way of example, mention can be made of a two waveguide interferometer of the Mach-Zehnder or Michelson type, which is used to obtain, in particular, a tunable filter or a modulator. Under such circumstances, the refractive index in one of the two waveguides is caused to vary so as to modify the transmission of the interferometer.

A Fabry-Perrot filter is a multiple wave interferometer in which a change of index causes resonant frequencies to be shifted and which can be used to obtain a tunable filter. A tunable laser is another particular case of this type of filter where the optical length of the cavity can be adjusted so as to control the emission wavelength very precisely. To do this, a phase section is disposed within the cavity, which phase section is a waveguide of modifiable index.

Mention can also be made of arrayed waveguide multiplexers/demultiplexers sometimes referred to as "phasars" or by the initials "AWG" (arrayed waveguide grating). The ability to modify the refractive index of waveguides can be used for tuning the spectral response of the components.

Naturally, it is also possible to modify the index of a simple waveguide that does not form part of an interferometer system. For example, in a junction, it can be important to modify the refractive index of one waveguide relative to another. For example, in a Y junction, by changing the index of one of the two outlet arms, it is possible to direct the inlet signal to one outlet or the other. This constitutes a switch known as a digital optical switch. The need for such systems is very important in all switching applications.

European patent EP-0 496 278 describes an optical device whose refractive index is controlled by a method based on the principle that the refractive index of a material containing mobile ions, i.e. an ionic conductor, varies reversibly as a function of the electric field applied thereto. The optical device comprises an ionic conductor made of a transparent material of high molecular weight containing mobile ions, and at least one pair of electrodes facing each other across the ionic conductor and in contact with the ionic conductor. When an electric field is applied to the conductor by means of the electrodes, its refractive index is modified in at least one ionic conductor zone, depending on the applied electric field. Under the effect of the potential difference applies across the electrodes, ions contained in the conductor move through the material so that the refractive index of the ionic conductor increases at one of its interfaces with the electrodes and decreases at its other interface. The device operates at low voltage, e.g. 20 volts (V).

The capacitance of the electrodes described is very small since ions can accumulate only on their surfaces. As a result, as soon as the voltage is no longer maintained, the change in index at the interface disappears quickly by self-discharge. In addition, the change in refractive index as obtained in that way is restricted to the contact interface between the ionic conductor and the electrodes. As a result the change is difficult to reverse and leads to an aging phenomenon. Finally, that device is not easy to use. It has the drawback of requiring its electrodes to be permanently maintained at a voltage that is relatively high (20 V) in order to conserve the desired refractive index, thereby leading to non-negligible consumption of electricity.

SUMMARY OF THE INVENTION

An object of the present invention is to eliminate the drawbacks of the prior art, and in particular to provide a device in which reversible variation of refractive index is obtained throughout the volume of the material while requiring voltages that are smaller (<20 V) than those previously known.

The present invention provides an optical device comprising an ionic conductor constituted by a material that is transparent to light and contains mobile ions, and at least one pair of electrodes, the refractive index in at least one zone of said ionic conductor being variable under the effect of a voltage applied between said electrodes, the device being characterized in that said electrodes are suitable for absorbing and desorbing ions and are in ionic contact with said ionic conductor.

The voltage applied to the electrodes varies the concentration of ions in the conductor. This variation of concentration propagates by diffusion within the ionic conductor. The variation in concentration depends on the ability of the electrodes to absorb and desorb ions, and on the quantity of ions present in the conductor. Varying the concentration of ions leads to a variation in the refractive index of the conductor.

The electrodes used contain an electrochemically active material whose function is to absorb and retain the ions extracted from the ionic conductor. Each of the electrodes contains an electrochemically active material which is selected from known active materials suitable for performing this function, and in particular from an active carbon, a conductive polymer, and an insertion material suitable for inserting ions in its structure.

In a first variant, the electrodes contain an active carbon as the electrochemically active material. It is preferable to use an active carbon having a specific surface area greater than 200 square meters per gram ($m^2/g$). Such electrodes are also known as "blocking" electrodes since they store ions using the principle of the electrochemical Helmholtz double layer. The quantity of ions that can be stored is proportional to the specific surface area of the material. In this case, the quantity Q of ions absorbed by the electrodes is proportional to the voltage applied between the two electrodes in application of the relationship Q=C×V where C is the ability of the electrodes to absorb and desorb ions, expressed in units of capacitance (i.e. Farads (F)).

In a second variant, a first electrode contains as its electrochemically active material a material suitable for inserting cations in its structure, while the second electrode contains as its electrochemically active material an insertion material suitable for inserting ions in its structure. The material suitable for inserting cations in its structure is preferably selected from an oxide of transition metals, a sulfide, a sulfate, and mixtures thereof. A material suitable for inserting anions in its structure is preferably selected from a graphitic oxide, an oxide, a coke, a carbon black, and a vitreous carbon. Amongst the transition metal oxides that are suitable for use in the present invention, mention can be made of vanadium oxide, lithium-containing oxides of manganese, nickel, and/or cobalt, and mixtures thereof.

In a third variant, the electrodes contain a conductive polymer as the electrochemically active material. The conductive polymer is preferably selected from a polypyrrole, a polythiophene, a polyaniline, a polyacetylene, and a polyparaphenylene. Most of these materials can be N or P doped. A P-doped material absorbs anions (negatively charged ions) and an N-doped material absorbs cations (positively charged ions).

Naturally, it is possible to combine the electrodes corresponding to the three variants described above with one another.

In the present invention, the electrodes are bulk electrodes, i.e. their entire volume is involved in the electrochemical reaction. They therefore possess high capacitance. As a result, as soon as the voltage is no longer applied, the memory effect is large and the resulting variation in index will hardly change. However, in order to conserve the refractive index precisely at the selected value, it is preferable to maintain the applied potential. Thus, all drift is avoided and electricity consumption is practically zero since well below 1 microamp ($\mu A$).

The device of the present invention comprises an ionic conductor containing mobile ions. The conductor comprises at least one cation and at least one anion. The cation may be selected from $Li^+$, $Na^+$, $K^+$, $Ca^{2+}$, and $NH_4+$. The anion may be selected from $CF_3SO_3^-$, $N(CF_3SO_2)_2^-$, $N(C_2F_5SO_2)_2^-$, $C(CF_3SO_2)_3^-$, $CF_3CO_3^-$, $ClO_4^-$, $BF_4^-$, $AsF_6^-$, $PF_6^-$, $BH_4^-$, $SCN^-$, $N_3^-$, $I^-$, and $Br^-$.

The material constituting the ionic conductor is preferably selected from a polymer containing a dissociated salt and a polymer containing a salt dissolved in a solvent.

The term "polymer containing a dissociated salt" is used to mean a polymer which complexes an ionizable salt. Under such circumstances, the polymer plays an active role relative to the salt since it contributes to its dissociation and to salvation of the ions. Such polymers are also referred to as "dry" polymers since they do not contain any solvent. As a polymer containing a dissociated salt, it is possible to select a polyether or a polyoxyethylene.

The term "polymer containing a salt dissolved in a solvent" is used to mean a polymer swollen by a solvent which contains a dissociated salt. The polymer is then said to be gelled or plasticized, and the liquid salt solution is often also referred to as a "plasticizer". Under such circumstances, the polymer plays a passive role relative to the salt since it contributes to a negligible extent to dissociation thereof and to solvation of the ions. As the polymer containing a salt dissolved in a solvent, it is possible to select: a thermoplastic polymer, a fluorine-containing homopolymer, or a fluorine-containing copolymer. When the polymer containing a salt dissolved in a solvent is a thermoplastic polymer, it is preferably selected from a polyacrylonitrile, a polymethyl methacrylate, a polyvinylchloride, and copolymers thereof.

Amongst the salts usable in the present invention, it is possible in non-exhaustive manner to select from: a lithium salt, a sodium salt, a potassium salt, a calcium salt, an ammonium salt, and a mixture of such salts. As lithium salt, it is preferable to select lithium perchlorate $LiClO_4$, lithium hexafluoroarsenate $LiAsF_6$, lithium hexafluorophosphate $LiPF_6$, lithium tetrafluoroborate $LiBF_4$, lithium trifluoromethanesulfonate $LiCF_3SO_3$, lithium trifluoromethanesulfonimide $LiN(CF_3SO_2)$ (LiTFSI), lithium trifluoromethanesulfonemethide $LiC(CF_3SO_2)_3$ (LiTFSM), or lithium bis(perfluoroethylsulfonimide) $LiN(C_2F_5SO_2)_2$ (BETI). As an ammonium salt, it is possible to use tetralkylammonium chloride.

The polymer-based ionic conductor containing mobile ions as described above is included in a waveguide. The waveguide has a guiding portion surrounded by a cladding portion. When it is desired to modify the refractive index of the ionically-conductive cladding portion and when the electrodes are not in direct contact with the guiding portion but are spaced apart therefrom by a layer of the material of the cladding portion, said material must be ionically conductive in order to ensure continuity of ionic contact between the electrodes and the guiding portion.

In a first embodiment of the invention, the electrodes are in physical contact with the guiding portion.

In a variant, the guiding portion and the cladding portion are ionic conductors. In which case, index variation takes place both in the guiding portion and in the cladding portion.

In another variant, the guiding portion is ionically conductive and the cladding portion is not an ionic conductor. In which case, index variation occurs only in the guiding portion.

In a second embodiment, the electrodes are disposed in physical contact with the cladding portion, but they are not in contact with the guiding portion.

In a variant, the guiding portion and the cladding portion are ionically conductive. The electrodes are then in ionic contact with the guiding portion via the cladding portion. While a voltage is applied between the electrodes, variation in salt concentration propagates by diffusion throughout the volume of the cladding portion and the guiding portion. Given the very small dimensions of an optical fiber or a waveguide, such diffusion occurs almost instantaneously.

In another variant, the guiding portion is not ionically conductive and the cladding portion is ionically conductive. The electrodes are then in ionic contact only with the cladding portion. In which case, the variation in salt concentration and thus the variation in refractive index occurs only in the cladding portion which results in a change in the mean effective refractive index $n_{\mathit{eff}}$ of the waveguide.

In a third embodiment, the electrodes are disposed respectively on opposite sides of the guiding portion.

In a fourth embodiment, the electrodes are respectively disposed on the same side of the guiding portion. When a voltage is applied between the electrodes, the variation in salt concentration propagates by diffusion throughout the volume of the cladding portion and of the guiding portion regardless of the relative disposition of the electrodes.

In a first implementation, the waveguide is an optical fiber comprising a core constituting the guiding portion and cladding constituting the cladding portion. Such a fiber is also known as plastic optical fiber (POF).

In a second implementation, the waveguide is a plane waveguide deposited on a substrate, comprising a guiding layer constituting the guiding portion and surrounded by cladding constituting the cladding portion. The waveguide may also be surrounded by a superstrate.

Naturally, the optical fibers and the waveguides to which the invention applies may be fabricated using any conventional method.

In a particular embodiment of the present invention, the guiding portion contains a Bragg grating.

The most remarkable advantage of the present invention lies in the fact that the change of index persists for a relatively long period of time even after the voltage has ceased to be applied, unlike the prior art. It suffices to apply a different voltage in order to cause the index to change again. The user can thus tune the value of the index to requirements on a permanent basis. In addition, index variation applies to the entire volume of the ionic conductor. Reversibility is excellent: 10 million cycles have been performed with blocking electrodes having active carbon as the active material.

The invention is more particularly intended for use with "monomode" type waveguides.

The present invention also provides a method of modifying the refractive index of an ionic conductor by means of at least one pair of electrodes, the conductor being constituted by a material that is transparent to light and that contains mobile ions, the method being characterized in that it comprises the following steps:

placing said electrodes in ionic contact with said conductor having an initial refractive index;
applying a voltage of less than 20 V between said electrodes so as to cause a variation in said initial index;
obtaining said ionic conductor with a modified refractive index; and
removing the applied voltage, with said modified refractive index being maintained.

The method of the invention has the advantage of applying voltages (<20 V) smaller than required by prior art methods (20 V), and for a short duration. The applied voltage is preferably not more than 5 V ($\leq 5$ V). At higher voltages, irreversible reactions might occur which would cause the device to age prematurely. There is no need to apply voltage for a very long duration. Voltage can be applied for a duration lying in the range 10 milliseconds (ms) to 100 ms.

BRIEF DESCRIPTION OF THE DRAWINGS

Other characteristics and advantages of the present invention appear from the following embodiments, which are naturally given by way of non-limiting illustration, and from the accompanying drawings.

DETAILED DESCRIPTION OF THE PREFERRED EMBODIMENTS

Figure 1:
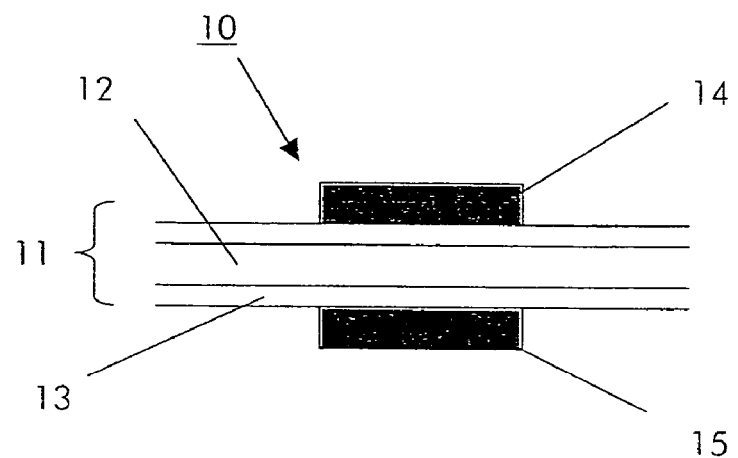
FIG. 1 is a longitudinal section through a first embodiment of the invention in which the ionic conductor is an optical fiber.

FIG. 1 shows a device 10 of the invention comprising an optical fiber 11 presenting a core 12 surrounded by cladding 13. The core 12 of refractive index $n_{12}$ is constituted by a material comprising a mixture made up of 80% by weight of O', O'-bis (2-aminopropyl) polyethylene glycol 1900 (sold under the trademark "Jeffamine" by the supplier Huntsman) and 20% by weight of ethylene glycol diglycidyl ether (from the supplier Aldrich), in which a salt has been added constituted by sodium iodide NaI at molar (1M) concentration, together with a cross-linking catalyst constituted by lithium perchlorate $LiCiO_4$ at a concentration of 0.1 M.

The cladding 13 having a refractive index $n_{13}$ greater than $n_{12}$ is constituted by a material analogous to that of the core but in which a fluorine-containing additive has been added in order to decrease its refractive index. The device 10 also comprises a first electrode 14 and a second electrode 15 disposed on either side of the optical fiber 11. The electrodes 14 and 15 are in ionic contact with the core 12 via the cladding 13 which is itself an ionic conductor. The two electrodes 14 and 15 are identical, each being constituted by a mixture comprising 50% by weight active carbon BRX manufactured by the supplier Norit and 50% by weight of the material constituting the core 12.

Figure 2:
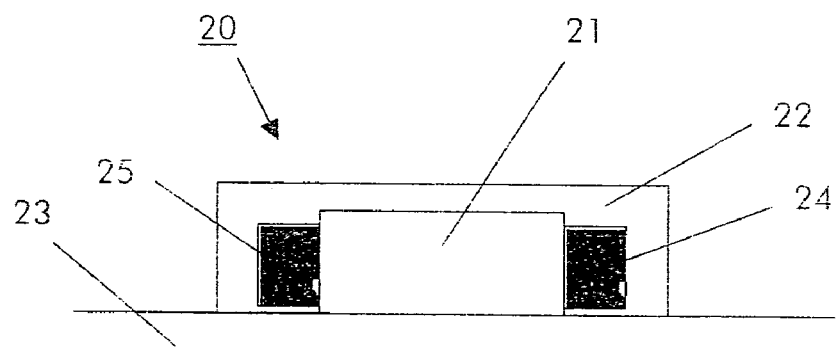
FIG. 2 is a cross-section through a second embodiment of the invention in which the ionic conductor is a plane waveguide.

The device 20 of the invention shown in FIG. 2 comprises a plane waveguide comprising a guiding layer 21 having a refractive index $n_{21}$, constituted by material analogous to that of the core 12 of FIG. 1, but in which a sulfur-containing additive has been added in order to increase its refractive index. The guiding layer 21 is surrounded by cladding 22 having a refractive index $n_{22}$ less than $n_{21}$, constituted by material analogous to that of the core 12 of FIG. 1. The guiding layer 21 surrounded by the cladding 22 is deposited on a substrate 23 which is preferably made of silicon Si or of indium phosphide InP. The device 20 also comprises a first electrode 24 and a second electrode 25 disposed on either side of the waveguide and in physical contact with the guiding layer 21: they are thus in ionic contact with the guiding layer 21. Both electrodes 24 and 25 are identical and made of a material analogous to that of the electrodes 14 and 15 of FIG. 1.

A voltage of 2.2 V is applied between the electrodes 24 and 25 in order to cause the index $n_{21}$ of the guiding layer 21 of the waveguide to vary. A variation $\Delta n_{21}$ is obtained of $5 \times 10^{-2}$. The capacitance of the device 20 is 0.02 F. Once the index variation $\Delta n_{21}$ has been obtained, if it is desired to maintain the voltage between the electrodes 24 and 25, then the current that is observed to flow is much less than 1 $\mu$A. If the applied voltage is removed, then the index variation persists for several hours at least. Subsequently, return to the initial state takes place very slowly. In the present case, the cladding 22 is also constituted by ionically conductive material. By diffusion, variation also occurs simultaneously in the refractive index $n_{22}$ of the cladding 22.

Figure 3:
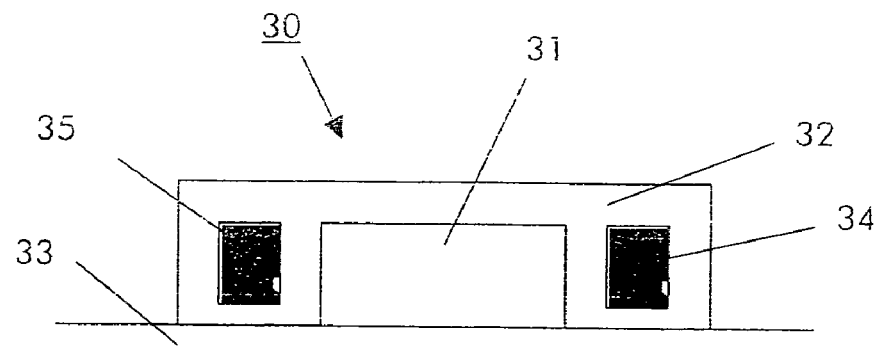
FIG. 3 shows a variant of the second embodiment in which the disposition of the electrodes is different.

FIG. 3 shows another device 30 of the invention comprising a plane waveguide comprising a guiding layer 31 with a refractive index $n_{31}$ surrounded by cladding 32 having a refractive index $n_{32}$ less than $n_{31}$ and constituted by a material analogous to that of the optical cladding 13 of FIG. 1. The guiding layer constituted by a material analogous to that of the core 12 of FIG. 1 but not containing the salt NaI (sodium iodide) is not ionically conductive. The guiding layer could equally well be constituted by silica. The waveguide is deposited on a substrate 33 analogous to that of FIG. 2. The device 30 also has a first electrode 34 and a second electrode 35 disposed in the cladding 32 on either side of the guiding portion 31, but not in physical contact with the guiding portion 31. The material constituting the cladding 32 is ionically conductive so the electrodes 34 and 35 are thus in ionic contact with the guiding layer 31 via the cladding 32. The two electrodes 34 and 35 are identical and they are made of a material analogous to that of the electrodes 14 and 15 of FIG. 1.

As above, a voltage of 2.2 V is applied between the two electrodes 34 and 35 in order to cause the index $n_{32}$ of the cladding 32 of the waveguide to vary. A variation $\Delta n^{32} = 5 \times 10^{-2}$ is obtained. The capacitance of the device 30 is 0.02 F. Once the variation $\Delta n_{32}$ has been obtained in the index, if it is desired to maintain the voltage between the electrodes 34 and 35, the current that is observed to flow is much less than 1 $\mu$A. If the applied voltage is removed, the change in index persists for several hours at least. Return to the initial state takes place very slowly. In the present case, the material constituting the guiding layer 31 is not ionically conductive since it does not contain any salt (NaI). There is thus no variation in the refractive index $n_{31}$ of the guiding layer 31. The use of such a guiding layer whose constituent material is not ionically conductive has the advantage of enabling the optical characteristics of the material used to be optimized without taking any other consideration into account.

Figure 4:
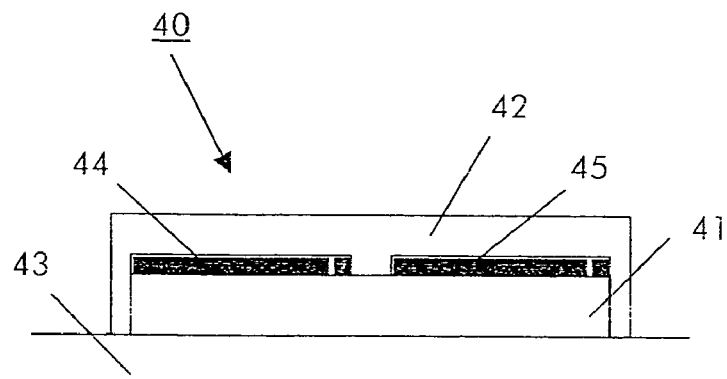
FIG. 4 is a cross-section view of a third embodiment of the invention in which the ionic conductor is a plane waveguide.

In the device 40 of FIG. 4, there can be seen a plane waveguide comprising a guiding layer 41 having a refractive index $n_{41}$ constituted by material analogous to that of the core 12 of FIG. 1. The guiding layer 41 is surrounded by cladding 42 having a refractive index $n_{42}$ less than $n_{41}$ and constituted by a material analogous to that of the cladding 13 of FIG. 1. The waveguide is deposited on a substrate 43 analogous to that of FIG. 2. The device 40 also comprises a first electrode 44 and a second electrode 45 that are disposed on the same side of and in physical contact with the guiding layer 41: they are thus in ionic contact with the guiding layer 41. The electrode 44 is constituted by a mixture comprising 50% by weight polythiophene and 50% by weight of the material constituting the core 12 of FIG. 1. The electrode 45 is constituted by a mixture comprising 50% by weight polypyrrole and 50% by weight of the material constituting the core 12 of FIG. 1.

Figure 5:
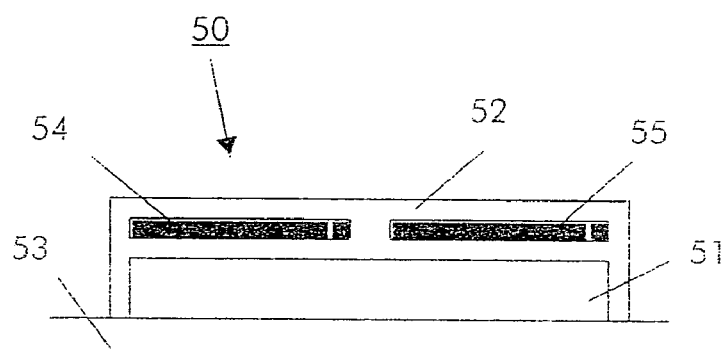
FIG. 5 shows a variant of the third embodiment in which the disposition of the electrodes is different.

In the device 50 of FIG. 5, there can be seen a plane waveguide analogous to that of FIG. 4, comprising a guiding layer 51 having a refractive index $n_{51}$ surrounded by cladding 52 having a refractive index $n_{52}$ less than $n_{51}$. The waveguide is deposited on a substrate 53 analogous to that of FIG. 2. The device 50 also comprises a first electrode 54 and a second electrode 55 disposed in the cladding 52 on the same side of the guiding layer 51 and in ionic contact therewith via the ionically conductive material of the cladding 52. The electrodes 54 and 55 are identical and are made of a material analogous to the materials of FIG. 4.

Figure 6:
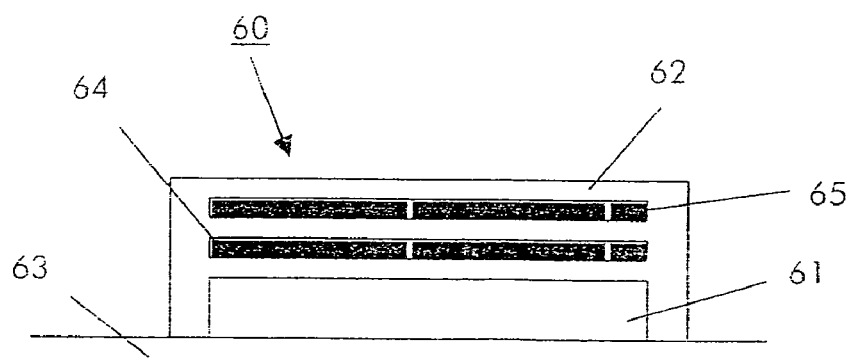
FIG. 6 is a cross-section view of a fourth embodiment of the invention in which the ionic conductor is a plane waveguide.

FIG. 6 shows another device 60 of the invention comprising a plane waveguide comprising a guiding layer 61 having a refractive index $n_{61}$, constituted by a material analogous to that of the core 12 in FIG. 1, in which a sulfur-containing additive has been added in order to increase its refractive index. The guiding layer 61 is surrounded by cladding 62 of refractive index $n_{62}$ less than $n_{61}$, constituted by a material analogous to that of the core 12 in FIG. 1. The waveguide is deposited on a substrate 63 analogous to that of FIG. 2. The device 60 also comprises a first electrode 64 and a second electrode 65 disposed in the cladding 62 on the same side of the guiding layer 61 and in ionic contact therewith via the cladding 62, which is itself ionically conductive. The electrode 64 is constituted by a mixture comprising 50% by weight polythiophene and 50% by weight of the material constituting the core 12 of FIG. 1. The electrode 65 is constituted by a mixture comprising 50% by weight polypyrrole and 50% by weight of the material constituting the core 12 of FIG. 1.

Figure 7:
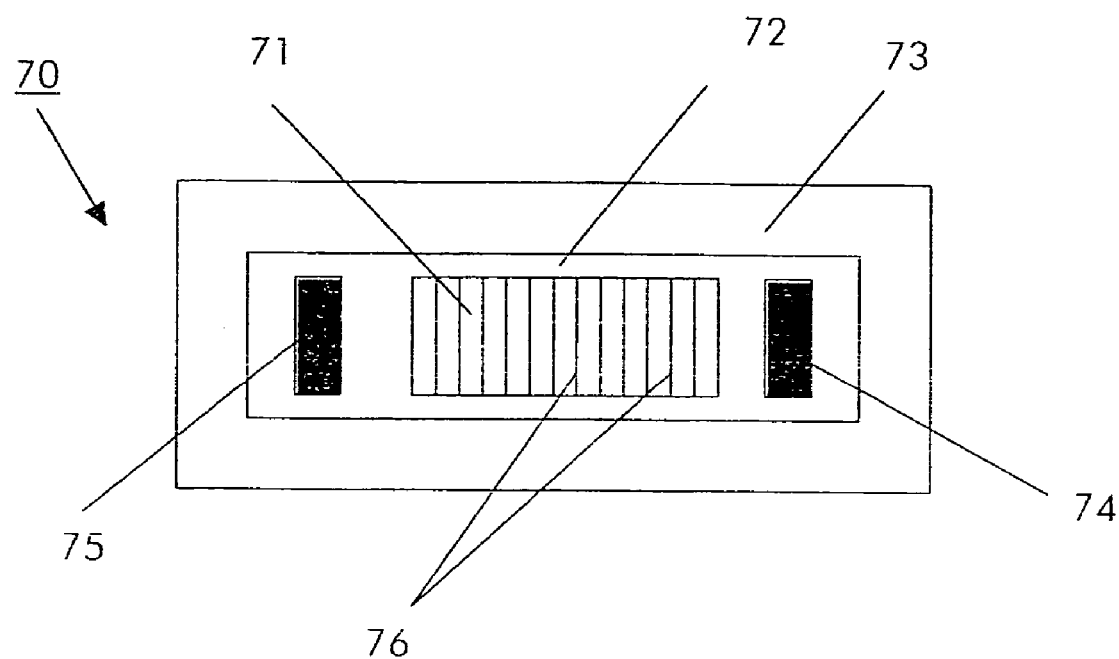
FIG. 7 is a longitudinal section view of a fifth embodiment of the invention in which the ionic conductor is a waveguide containing a Bragg grating.

FIG. 7 shows a device 70 of the invention. A waveguide comprises a guiding layer 72 having a refractive index $n_{72}$ and is surrounded by cladding 73 having a refractive index $n_{73}$ less than $n_{72}$. The guiding layer 72 is constituted by silica and it is not ionically conductive. The cladding 73 is constituted by a material analogous to that of the cladding 13 in FIG. 1. The device 70 further comprises a first electrode 74 and a second electrode 75 disposed in the cladding 73 on either side of the guiding layer 71. The electrodes 74 and 75 are thus in ionic contact with the cladding 73 which is itself an ionic conductor. The electrodes 74 and 75 are identical and are constituted by a material analogous to the material of the electrodes 14 and 15 of FIG. 1.

A portion of the guiding layer 72 of the fiber 71 is used as an adjustable filter. A Bragg grating 76 has been formed therein which is constituted by periodic variation in the amplitude $\Delta n_{72}$ of the refractive index of the layer 72 about its mean value $n_{72}$ with a spatial period $\Lambda$ (grating pitch) along the propagation axis of the wave. The Bragg grating may also be obtained by variation in the index $\Delta n_{73}$ of the cladding 73 about its mean value $n_{73}$. If a voltage U, e.g. 3 V, is applied between the electrodes 74 and 75, the variation in the mean effective index of the waveguide $n_{eff}$ induced by said voltage gives rise to variation in the center wavelength $\lambda_b$ of the filter by virtue of the relationship: $\lambda_b = 2 \cdot n_{eff} \cdot \Lambda$.

The mean effective refractive index $n_{eff}$ represents a characteristic magnitude of the filter which is a function of $n_{72}$ and $n_{73}$. That is why it is possible to obtain variation of $n_{\mathit{eff}}$ by varying either $n_{72}$ or $n_{73}$ or indeed both of them. The direction in which the index $n_{\mathit{eff}}$ varies depends on the respective indices of the salt and of the polymer constituting the ionic conductor: if the salt has an index greater than that of the polymer, the extraction of salt will lower the index of the core, and vice versa.

Naturally, a waveguide containing a Bragg grating can be made not only using an optical fiber, but also using any type of waveguide, and in particular plane waveguides of the kind used in integrated optics.

In the present case, the Bragg grating may be made in the silica guiding portion by a known optical, mechanical, or chemical method leading to physical modification of the support. It is possible to inscribe a Bragg grating in a polymer, in particular under the effect of irradiation. This can be done providing the polymer is photosensitive. The use of a holographic method has also been mentioned (B. L. Booth et al.: "Polyguide™ polymeric technology for optical interconnect circuits and components", SPIE 1997).

Bragg gratings are in particularly widespread use in devices for wavelength-division multiplexing (WDM) applications.

Figure 8:
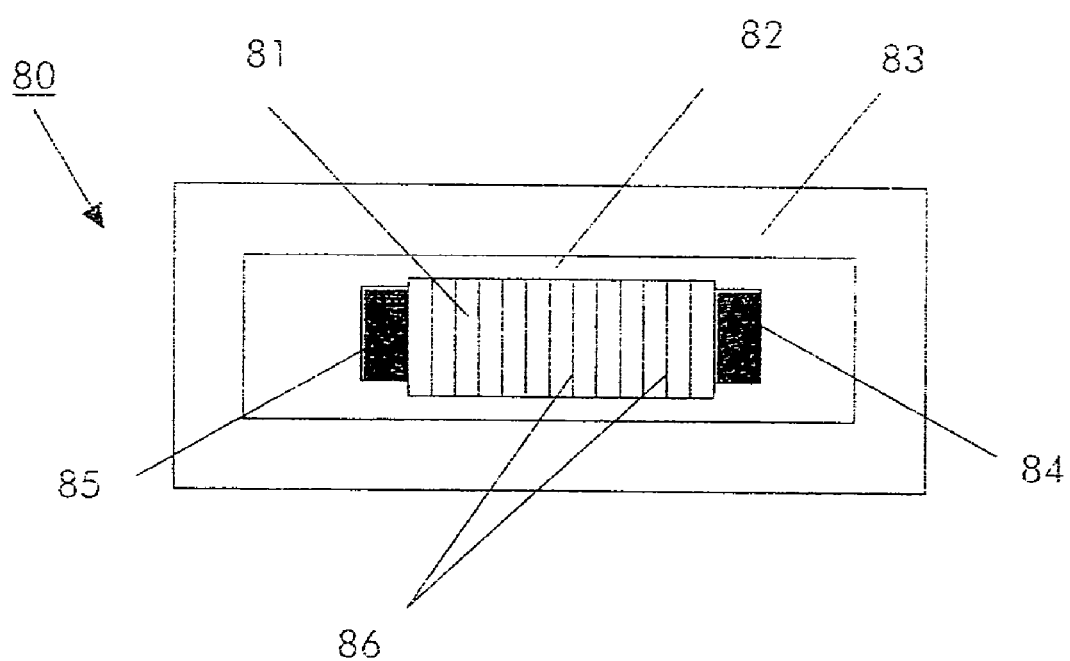
FIG. 8 is a view analogous to FIG. 7 showing a variant of the fifth embodiment in which the disposition of the electrodes is different.

FIG. 8 shows a device 80 of the invention. A waveguide comprises a guiding layer 82 having a refractive index $n_{72}$ and surrounded by cladding 83 having a refractive index $n_{73}$ less than $n_{72}$. The guiding layer 82 is constituted by a material analogous to that of the core 12 of FIG. 1. The cladding 83 is constituted by a material analogous to that of the cladding 13 of FIG. 1. The device 80 also comprises a first electrode 84 and a second electrode 85 both disposed on the same side of and in physical contact with the guiding layer 82: they are thus in ionic contact with the guiding layer 82. The electrodes 84 and 85 are identical and they are made of a material analogous to the material of the electrodes 14 and 15 of FIG. 1.

What is claimed is:

1. An optical device comprising an ionic conductor constituted by a material that is transparent to light and contains mobile ions, and at least one pair of electrodes, the refractive index in at least one zone of said ionic conductor being variable under the effect of a voltage applied between said electrodes, the device being characterized in that said electrodes are suitable for absorbing and desorbing ions and are in ionic contact with said ionic conductor.

2. A device according to claim 1, in which each of said electrodes contains an electrochemically active material selected from an active carbon, a conductive polymer, and an insertion material suitable for inserting ions in its structure.

3. A device according to claim 2, in which said electrodes contain an active carbon as the electrochemically active material.

4. A device according to claim 3, in which said active carbon has a specific surface area greater than 200 $m^2$/g.

5. A device according to claim 2, in which the first of said electrodes contains as its electrochemically active material a material that is suitable for inserting cations in its structure, and the second of said electrodes contains as its electrochemically active material an insertion material suitable for inserting anions in its structure.

6. A device according to claim 5, in which said material suitable for inserting cations in its structure is selected from a transition metal oxide, a sulfide, a sulfate, and mixtures thereof.

7. A device according to claim 5, in which said material suitable for inserting anions in its structure is selected from a graphitic oxide, a graphite, a coke, a carbon black, and a vitreous carbon.

8. A device according to claim 2, in which said electrodes contain a conductive polymer as their electrochemically active material.

9. A device according to claim 8, in which said conductive polymer is selected from; a polypyrrole, a polythiophene, a polyaniline, a polyacetylene, and a polyparaphenylene.

10. A device according to claim 1, in which said ionic conductor contains mobile ions comprising at least one cation selected from: $Li^+$, $Na^+$, $K^+$, $Ca^{2+}$, and $NH_4^+$, and at least one anion selected from: $CF_3SO_3^-$, $N(CF_3SO_2)_2^-$, $N(C_2F_5SO_2)_2^-$, $C(CF_3SO_2)_3^-$, $CF_3CO_3^-$, $ClO_4^-$, $BF_4^-$, $AsF_6^-$, $PF_6^-$, $BH_4^-$, $SCN^-$, $N_3^-$, $I^-$, and $Br^-$.

11. A device according to claim 10, in which the material constituting said guiding portion is selected from a polymer containing a dissociated salt and a polymer containing a salt dissolved in a solvent.

12. A device according to claim 11, in which said material containing a dissolved salt is selected from a polyether and a polyoxyethylene.

13. A device according to claim 11, in which said polymer containing a salt dissolved in a solvent is selected from a thermoplastic polymer, a fluorine-containing homopolymer, and a fluorine-containing copolymer.

14. A device according to claim 13, in which said polymer containing a salt dissolved in a solvent is a thermoplastic polymer selected from: a polyacrylonitrile, a polymethyl methacrylate, a polyvinylchloride, and copolymers thereof.

15. A device according to claim 11, in which said salt is selected from lithium perchlorate, lithium hexafluoroarsenate, lithium hexafluorophosphate, lithium tetrafluoroborate, lithium trifluoromethanesulfonate, lithium trifluoromethanesulfonimide, lithium trifluoromethanesulfonemethide, lithium bis(perfluoroethylsulfonimide), and tetralkylammonium.

16. A device according to claim 1, in which said ionic conductor is included in a waveguide comprising a guiding portion and a cladding portion.

17. A device according to claim 16, in which said electrodes are disposed in physical contact with said guiding portion.

18. A device according to claim 17, in which said guiding portion and said cladding portion are ionically conductive.

19. A device according to claim 17, in which said guiding portion is ionically conductive and said cladding portion is not ionically conductive.

20. A device according to claim 16, in which said electrodes are disposed in physical contact with said cladding portion.

21. A device according to claim 20, in which said guiding portion and said cladding portion are ionic conductors.

22. A device according to claim 20, in which said guiding portion is not ionically conductive and said cladding portion is ionically conductive.

23. A device according to claim 16, in which said electrodes are disposed respectively on opposite sides of said guiding portion.

24. A device according to claim 16, in which said electrodes are respectively disposed on the same side of said guiding portion.

25. A device according to claim 16, in which said waveguide is an optical fiber.

26. A device according to claim 16, in which said waveguide is a plane waveguide.

27. A device according to claim 16, in which said guiding portion includes a Bragg grating.

28. A method of modifying the refractive index of an ionic conductor by means of at least one pair of electrodes, suitable for absorbing and desorbing ions the conductor being constituted by a material that is transparent to light and contains mobile ions, the method being characterized in that it comprises the following steps:
  placing said electrodes in ionic contact with said conductor having an initial refractive index;
  applying a voltage of less than 20 V between said electrodes so as to cause a variation in said initial index;
  obtaining said ionic conductor with a modified refractive index; and
  removing the applied voltage, with said modified refractive index being maintained.

29. A method according to claim 28, in which said voltage is not more than 5 V.

30. A method according to claim 28, in which said voltage is applied for a duration lying in the range 10 ms to 100 ms.

* * * * *